US006041876A

United States Patent [19]

Pulver et al.

[11] Patent Number: 6,041,876

[45] Date of Patent: Mar. 28, 2000

[54] ANTI-TIP ASSEMBLY FOR POWER WHEELCHAIR

[75] Inventors: Dale A. Pulver, University Heights; Roland A. Mentessi, North Royalton, both of Ohio

[73] Assignee: Invacare Corporation, Elyria, Ohio

[21] Appl. No.: 08/944,246

[22] Filed: Oct. 6, 1997

[51] Int. Cl.$^7$ ....................................................... B60K 1/00

[52] U.S. Cl. ..................... 180/65.1; 180/907; 280/304.1; 280/767; 297/310; 403/61

[58] Field of Search ..................... 280/124.128, 124.132, 280/124.133, 304.1, 298, 299, 304, 755, 767; 180/65.1, 907; 403/53, 59, 61; 297/310, DIG. 4

[56] References Cited

U.S. PATENT DOCUMENTS

| | | | |
|---|---|---|---|
| 968,427 | 8/1910 | Simon | 280/11.2 |
| 1,478,428 | 12/1923 | Duncan | 280/755 |
| 2,834,608 | 5/1958 | Wixson | 280/767 |
| 4,750,578 | 6/1988 | Brandenfels | 280/767 X |
| 5,294,141 | 3/1994 | Mentessi et al. | 280/304.1 X |
| 5,401,038 | 3/1995 | Peck et al. | 280/11.2 |
| 5,564,512 | 10/1996 | Scheulderman | 280/767 X |
| 5,575,348 | 11/1996 | Goertzen et al. | 180/65.6 |
| 5,707,079 | 1/1998 | Ruser | 280/767 |

*Primary Examiner*—Michael Mar
*Attorney, Agent, or Firm*—Daniel J. Hudak; Hudak & Shunk Co., L.P.A.

[57] ABSTRACT

The power wheelchair includes an anti-tip assembly extending from the frame. The anti-tip assembly includes a plate secured to the frame via a dampening mechanism. A first arm extends from the plate and is mounted thereto for a limited amount of relative movement. A grounding engaging wheel disposed on a distal end of the arm is urged toward the ground surface by a biasing spring interposed between the arm and the plate. As the wheelchair begins to tip, anti-tip or resistive forces are generated initially by the biasing spring. This resisting force continues in a linear fashion until relative movement between the arm and the plate ceases. Thereafter, further resistive forces are provided by the dampener as movement of the plate toward the frame is resisted in a linear fashion by the dampener.

5 Claims, 5 Drawing Sheets

ANTI-TIP ASSEMBLY FOR POWER WHEELCHAIR

BACKGROUND OF THE INVENTION

This invention relates to an anti-tip assembly for power wheelchairs in which a pair of drive wheels are operatively driven by one or more motors powered by an onboard battery assembly. Although the invention is particularly described with reference to a power wheelchair, it may also find application in related environments such as scooters or the like.

Power drive wheelchairs incorporating an anti-tip assembly are well known in the art. For example, commonly owned U.S. Pat. No. 5,575,348, the disclosure of which is incorporated herein by reference, is representative of an earlier generation of this product. The '348 patent shows and describes a spring dampener secured at one end to a frame and at an opposite end to an anti-tip assembly. The anti-tip assembly extends from an arm that also supports the drive motor so that the dampener acts as both a suspension for the wheelchair, as well as a portion of the anti-tip assembly that effectively resists tipping forces imposed by initial acceleration of the wheelchair.

In an effort to improve upon this commercially successful arrangement, and isolate the anti-tip assembly from the suspension during most tipping action, consideration is given to providing a separate anti-tip force resistance and using the dampener only through a latter part of a tipping action, if necessary. Because the anti-tip assembly is always connected through the suspension mechanism in the prior arrangement, there may be situations where the anti-tip mechanism of the prior arrangement lifts the drive wheels off the ground. The wheelchair could be stuck until the obstacle is overcome.

Simultaneously, it is desired to use as much of the structure of the commercially successful version as possible. This, of course, reduces inventory, and also provides for easy modification of an existing design.

Consequently, it has been considered desirable to develop a new and improved anti-tip assembly for a power wheelchair that overcomes the noted problems and achieves these various objectives.

SUMMARY OF THE INVENTION

According to the invention, a power wheelchair includes first and second drive wheels secured to a frame and powered by a motor. An anti-tip assembly includes a plate extending from the frame and an arm extending from the plate adapted for relative movement thereto. A ground engaging surface is defined at a distal end of the arm and is urged toward the ground surface by a biasing member connected at one end to the plate, and at the other end to an intermediate portion of the arm. Thus, initial anti-tip forces are provided by the biasing member resisting movement of the arm relative to the plate, and subsequently by the dampener when the relative movement between the arm and the plate has ceased.

According to another aspect of the invention, a pair of diverging slots are provided in the plate to allow a rotational and translational movement of the arm relative to the plate. Once pins associated with the arms engage opposite or upper ends of the slots, the anti-tip forces are then generated by the dampener.

According to another aspect of the invention, a smooth surface on the distal end of the arm is provided by a rotating wheel.

A primary advantage of the invention resides in the simplified structure that provides effective anti-tip forces.

Another advantage of the invention is found in an improved anti-tip assembly achieved by modifying an existing structure.

Still other features and benefits of the invention will become apparent to those skilled in the art upon a reading and understanding of the detailed description.

BRIEF DESCRIPTION OF THE DRAWINGS

The invention may take form in certain parts and arrangements of parts, a preferred embodiment of which will be described in this specification. The drawings include.

DETAILED DESCRIPTION OF THE PREFERRED EMBODIMENT

Figure 1:
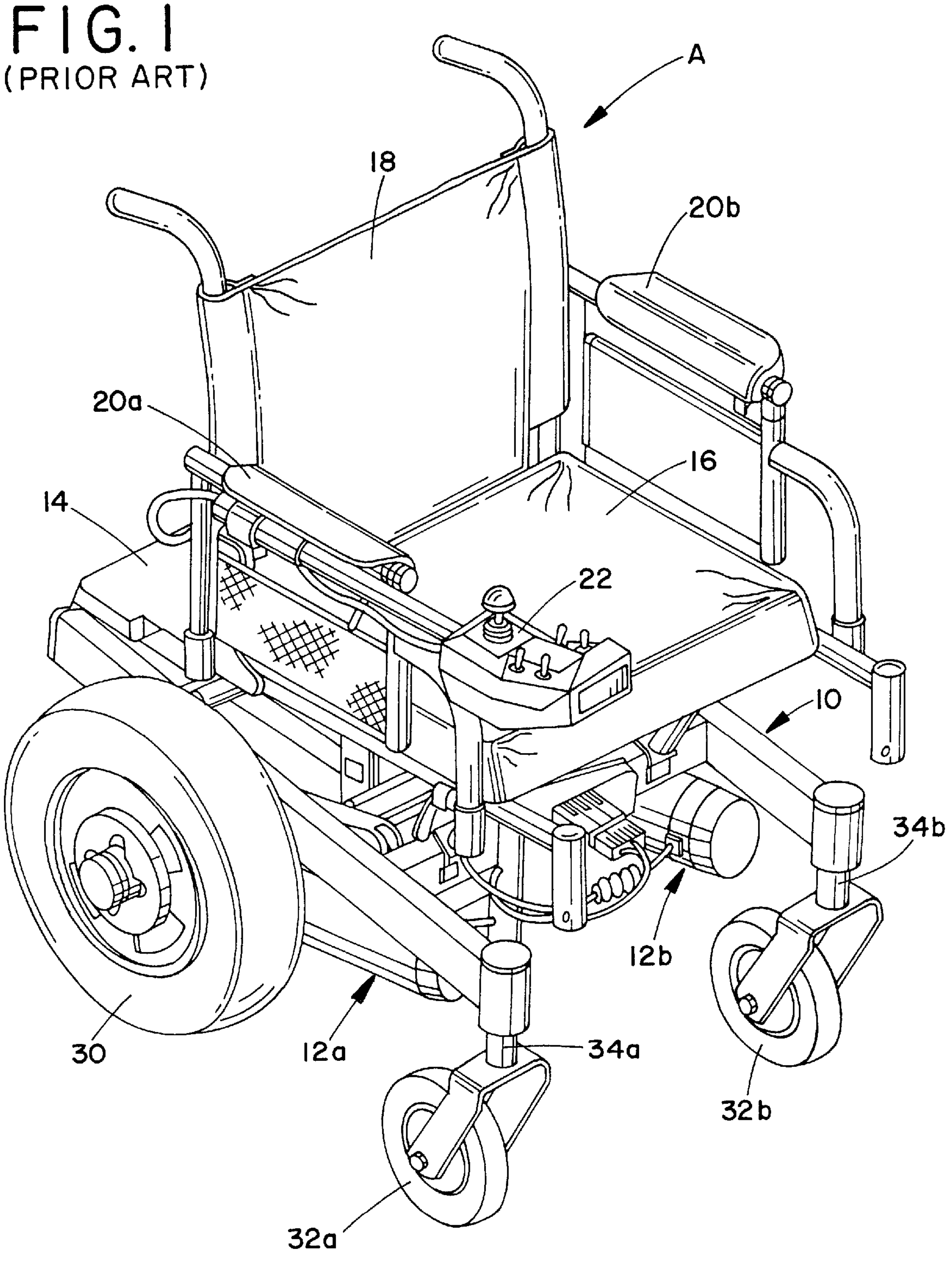
FIG. 1 (PRIOR ART)
FIG. 1 is a perspective view of a prior art power wheelchair of the type under consideration.

Referring now to the drawings wherein the showings are for the purposes of illustrating the preferred embodiment of the invention only and not for purposes of limiting the invention, the Figures show a power wheelchair A of the type shown and described in commonly owned U.S. Pat. No. 5,575,348. More particularly, the wheelchair A includes a frame 10, such as a conventional H-shaped frame defined by a pair of longitudinal frame members that extend fore and aft and an interconnecting cross-frame member. Secured to the frame is a drive assembly that includes a pair of motors 12*a*, 12*b*. The motors are powered by an on-board battery 14. A seat defined by seat portion 16 and a seat back 18 is also mounted to the frame. The seat may adopt a number of different configurations, including a non-adjustable standard seat, a tilt and/or recline seat, a van style seat, or a customized cushion mounted on a rigid seat pan that may include pelvic, head, or thigh pads/bolsters as desired by the user.

Preferably mounted on one of the arm rests 20*a*, 20*b* is a motor controller such as a joystick controller 22. As is well known in the art, movement of the joystick in forward, rearward, leftward and rightward directions selectively powers the drive wheels, here shown as enlarged drive rear drive wheels 30, for desired steering of the wheelchair. Typically, a pair of driven wheels such as the illustrated small diameter front wheels 32 are provided on the chair. The front wheels are caster mounted 34 at front end portions of the longitudinal frame members, allowing the front wheels to rotate about respective vertical axes.

Although not shown or described herein for purposes of brevity, it will be understood that still other customized features may be incorporated into the power wheelchair, such as front riggings, footplates, leg rests, etc., without departing from the scope and intent of the present invention.

Figure 2:
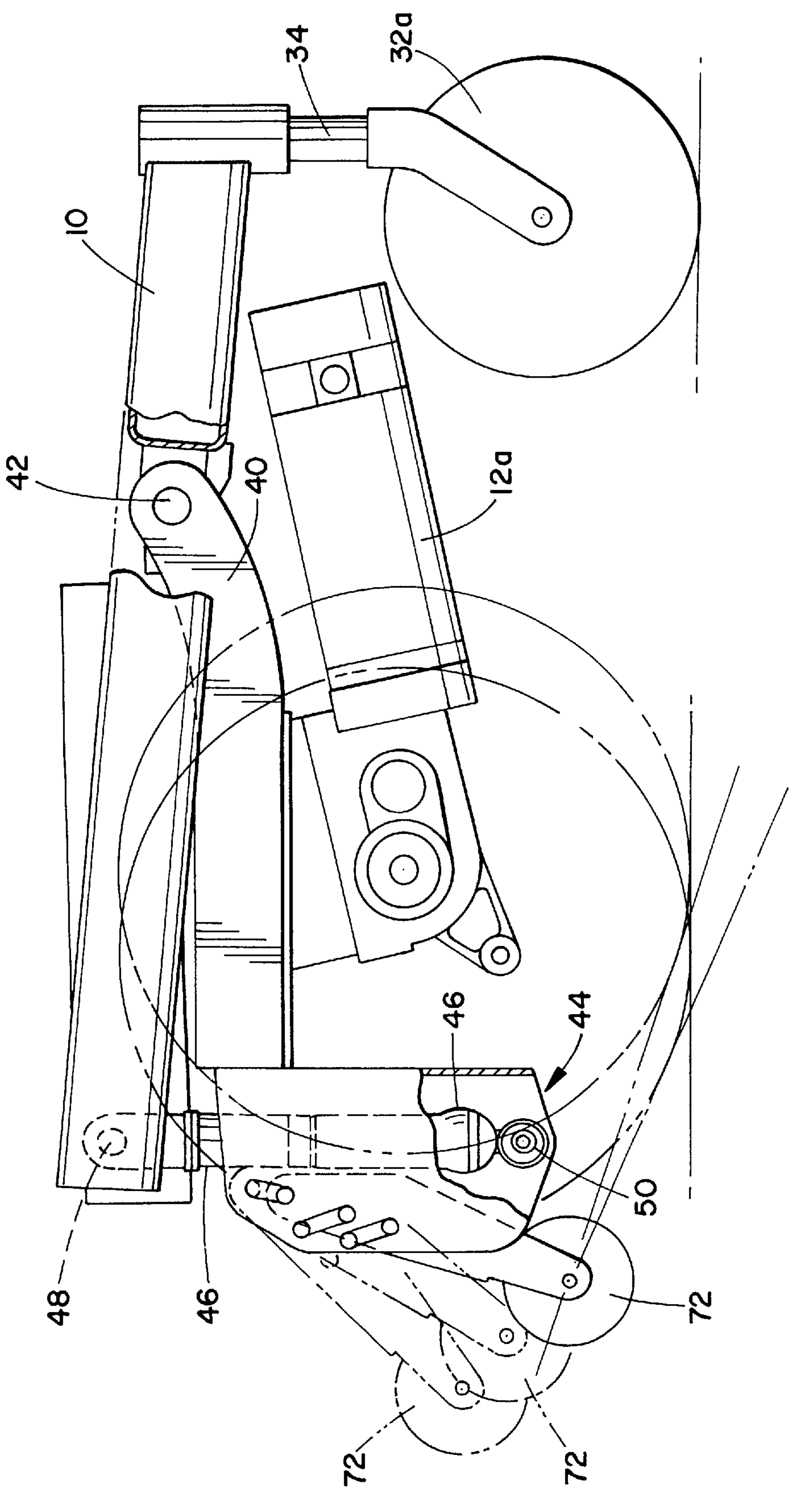
FIG. 2 is an elevational view of the power wheelchair incorporating the new anti-tip assembly and with selected features of the power wheelchair removed for ease of illustration.
Figure 3:
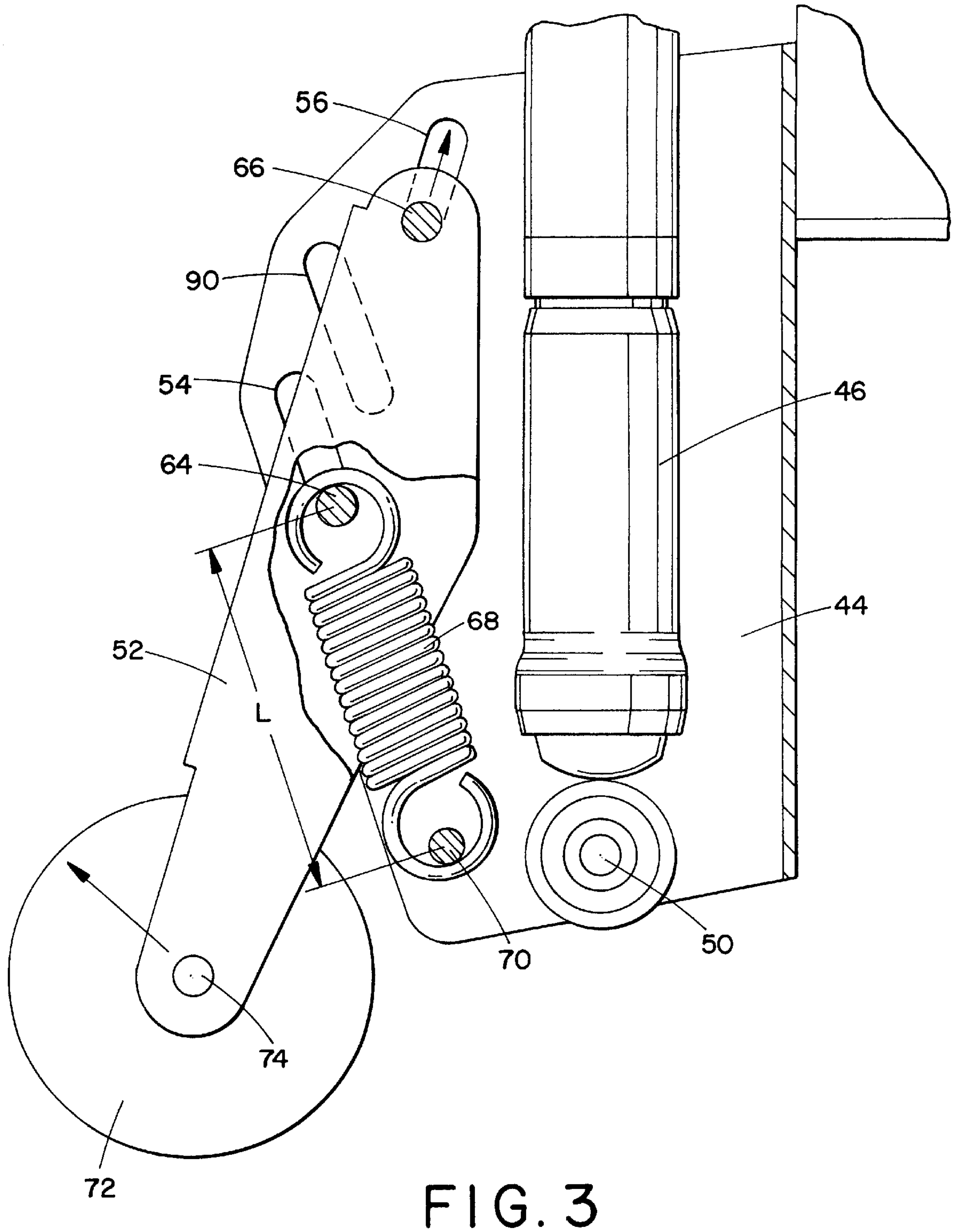
FIG. 3 is an enlarged view of the new anti-tip assembly.
Figure 4:
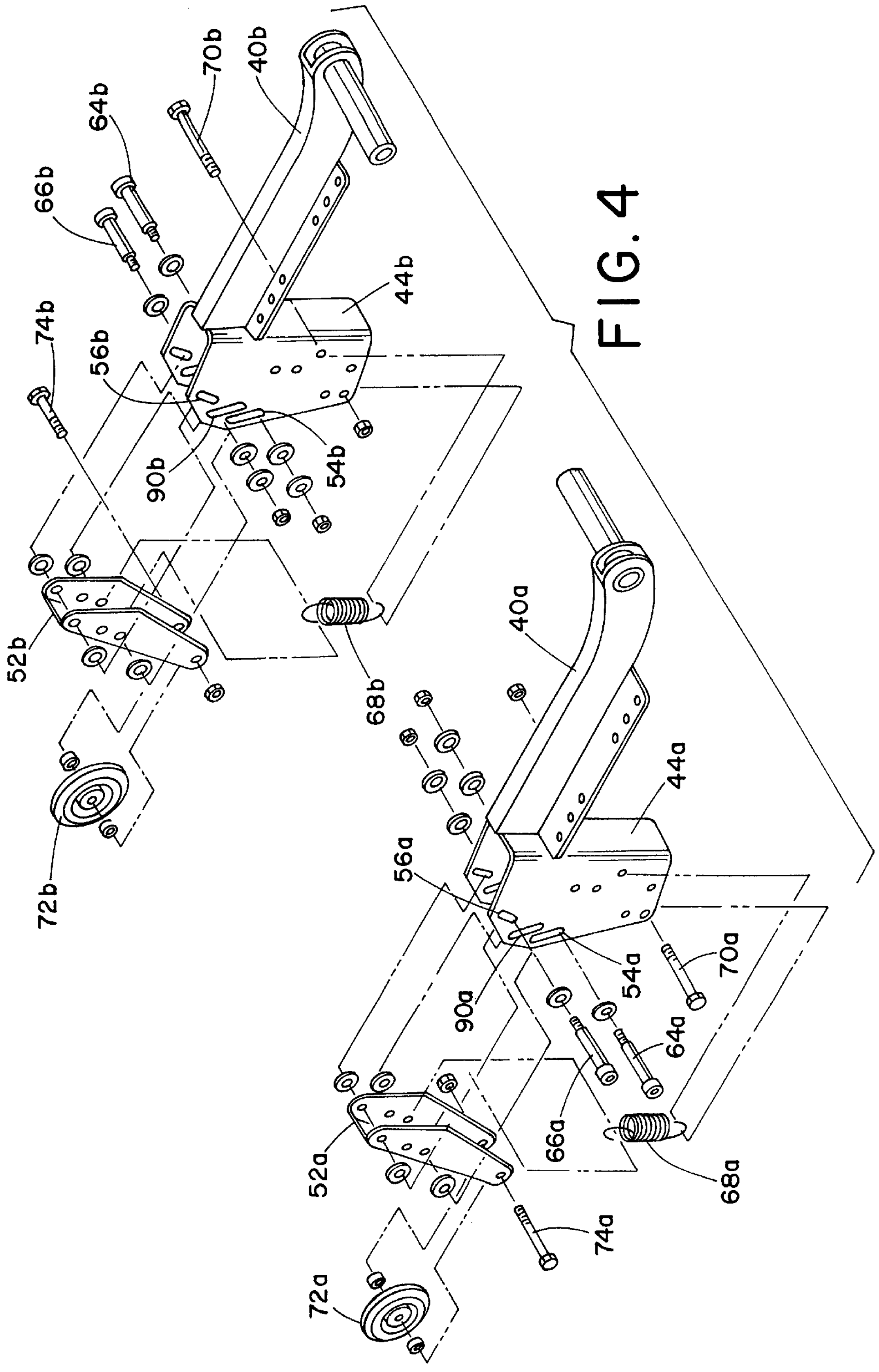
FIG. 4 is a perspective view of the new anti-tip assembly.

For purposes of consistency, like reference numerals will be used in FIGS. 2–4 to refer to like elements already described with regard to the power wheelchair of FIG. 1. Likewise, new elements will be described by new numerals. Shown in FIG. 2, an elongated arm 40 is pivotally secured by pin 42 at a first end to an intermediate region of the frame. On a second or distal end of the elongated arm, is provided a plate 44, which is preferably defined by U-shaped channel structure that includes a pair of parallel plates disposed on opposite sides of dampener 46. The dampener is secured at a first end 48 to one end of the frame, preferably an end of the frame opposite the frame end where the driven wheels 32 are mounted. A second end 50 of the dampener is secured to the plate 44. Since the drive motors and drive wheels all are secured to the elongated arm 40, it will be appreciated that the dampener 46 also acts as a suspension shock absorber for the wheelchair.

With continued reference to FIG. 2 and additional reference to FIG. 3, a rigid metal arm 52 is mounted for limited movement relative to the plate 44. In the preferred arrangement, the arm is a U-shaped configuration (FIG. 4). The arm is received between the parallel portions of the plate 44 for limited movement relative to the plate. The movement is defined by a pair of slots 54, 56 formed in the parallel plate portions. Each slot 54, 56 receives a pin 64, 66, respectively, and the pins also extend through lower and upper portions of the arm, respectively. As will be appreciated, the pins are adapted for movement within the slots, and are shown in their normal at-rest position in FIG. 3. This at-rest position is a result of the force imposed by biasing member 68 that forms another key portion of the anti-tip assembly. The biasing member, illustrated in the preferred embodiment as coil spring 68, is secured at a first end about a pin 70 to the frame. The pin 70 does not move relative to the frame so that the first or lower end of the spring is fixed thereto. A second end of the spring is received about a pin 64 received in groove 54 in the plate. Since the pin 64 is secured to arm 52, it urges the arm toward its downward, counterclockwise position shown in FIG. 3. There, pin 66 is disposed against a lower end of slot 56 while pin 64 is likewise engaging a lower end of slot 54.

Mounted on a distal end of the arm is a smoothly curved, ground-engaging surface defined by the peripheral surface of rotating wheel 72. The wheel has an axis 74 at an end of the first arm and is adapted to engage the ground surface when the wheelchair begins to tip.

Referring again to FIG. 3, initial resistive or anti-tip forces are provided by the biasing spring 68. That is, the wheel engages the ground surface and the movement of the first arm is dictated by the movement of the pins in the associated slots. In essence, the wheel moves upwardly and toward the left as shown in FIGS. 2 and 3, this movement being resisted by the linear force imposed by the spring. During this relative movement of the first arm relative to the plate, it is only the biasing spring 68 which opposes the tipping action of the wheelchair.

Ultimately, pin 64 reaches the opposite or upper end of the associated slot 54. Likewise, pin 66 reaches the opposite or upper end of slot 56. When this occurs, further movement of the first arm relative to the plate in this direction is precluded. Thus, if tipping motion is still occurring, the anti-tipping forces are then generated by the dampener 46 that extends between the plate and the frame. Again, this provides a linear anti-tip force that is associated with the dampener 46.

Figure 5:
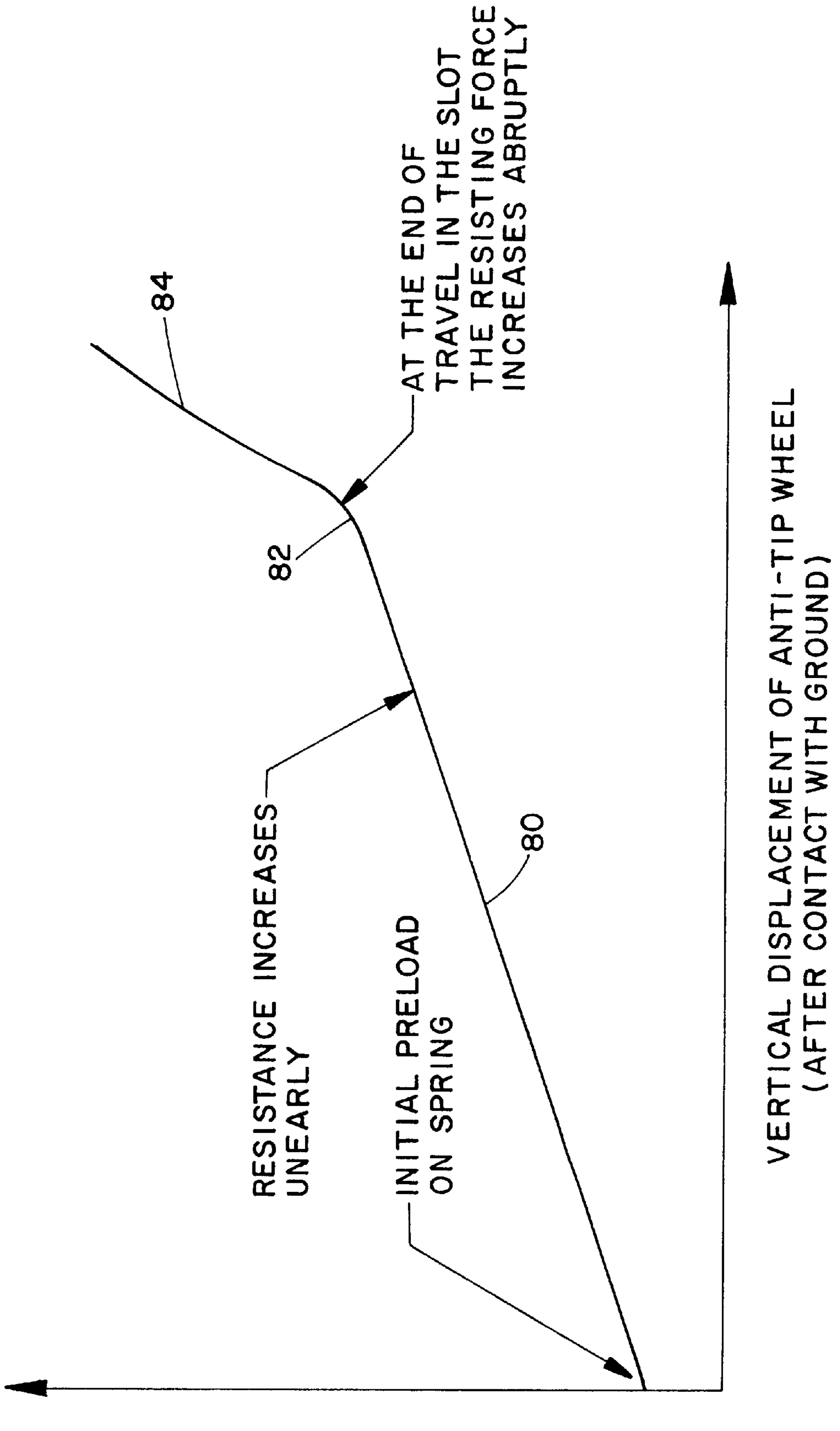
FIG. 5 is a graphical representation of resistive forces generated by the new anti-tip assembly.

These resisting forces are generally illustrated in the graph of FIG. 5. The spring has an initial preload so that until the tipping forces reach this preload, no anti-tipping or resisting forces are provided. Thereafter, the first arm begins to move relative to the plate and is resisted by the spring force 68. This is represented by portion 80 of the curve. It will be appreciated that a different spring having a different spring rate could be substituted if desired. Thus, even though the resisting force will still be linear, it will be defined by a different spring rate or constant associated with the new spring.

Once the first arm has completed its movement relative to the plate, the dampener then takes over. This changeover is represented at point 82 on the graph. The increase in the resisting force for a small amount of change in vertical displacement is then represented by the portion 84 in the graph. This is associated with the resisting force provided by the dampener 46.

Still another adjustment that may be made is represented by slot 90 on the plate. The slot 90 is parallel to the slot 54 but is located closer to the slot 56 in the plate. Thus, by inserting the pin 64 in the slot 90, the movement of the arm will be altered. The operation of the anti-tip assembly, though, is substantially as described above and allows the wheelchair to overcome small obstacles because of the arm that is movable relative to the suspension assembly.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

We claim:

1. A wheelchair for use on a ground surface comprising:

a frame;

a seat received on the frame;

a first arm pivotally connected to the frame;

a driven wheel secured to a portion of the arm;

at least one motor for powering the driven wheel;

a plate attached to the rearward portion of the first arm;

a dampener connected between the the frame and the plate, the dampener acting as a suspension for the driven wheel by exerting a first biasing force on the rearward portion of the first arm;

a second arm extending from the plate and having a lower end with a smooth surface adapted to engage the ground surface, the second arm having at least two guide members extending through respective non-parallel slots in the plate for movement of the guide members in non-parallel directions within the slots to provide a predetermined range of movement of the second arm relative to the plate; and a biasing member having a first end secured to the plate and a second end secured to one of the pins for exerting a second biasing force on the second arm for urging the lower end of the second arm downwardly towards the ground surface, the first biasing force being greater than the second biasing force, whereby upon rearward tilting of the wheelchair, an initial anti-tipping force is provided by the biasing member until the second arm has substantially completed its predetermined range of movement, whereupon an additional anti-tipping force is provided by the dampener upon further rearward tilting of the wheelchair.

2. The wheelchair of claim 1 wherein the smooth surface is defined by a rounded surface that engages the ground surface.

3. The wheelchair of claim 2 wherein the rounded surface is defined as a wheel that is mounted for rotation relative to the second arm.

4. A wheelchair for use on a ground surface comprising:

a frame;

a seat received on the frame;

a first arm pivotally connected to the frame;

a driven wheel secured to a portion of the arm;

at least one motor for powering the driven wheel;

a plate attached to the rearward portion of the first arm;

a dampener connected between the the frame and the plate, the dampener acting as a suspension for the driven wheel by exerting a first biasing force on the rearward portion of the first arm;

a second arm extending from the plate and having a lower end with a smooth surface adapted to engage the ground surface, at least two pins extending through the second arm and received in respective non-parallel slots in the plate for movement of the pins in non-parallel directions within the slots to provide a predetermined range of movement of the second arm relative to the plate; and a biasing member having a first end secured to the plate and a second end secured to one of the pins for exerting a second biasing force on the second arm for urging the lower end of the second arm downwardly towards the ground surface, the first biasing force being greater than the second biasing force, whereby upon rearward tilting of the wheelchair, an initial anti-tipping force is provided by the biasing member until the second arm has substantially completed its predetermined range of movement, whereupon an additional anti-tipping force is provided by the dampener upon further rearward tilting of the wheelchair.

5. The power wheelchair of claim 4 wherein the smooth surface is on a wheel mounted for rotation relative to the second arm.

* * * * *